United States Patent
Umezawa et al.

(10) Patent No.: US 9,304,797 B2
(45) Date of Patent: Apr. 5, 2016

(54) CREATING AND DEPLOYING VIRTUAL MACHINES TO A VIRTUAL MACHINE APPARATUS BASED ON TENDENCY OF USAGE, DEPLOYMENT RESULTS, AND SETTING INFORMATION OF VIRTUAL MACHINE CLIENTS

(71) Applicant: Hitachi, Ltd., Tokyo (JP)

(72) Inventors: Katsuyuki Umezawa, Tokyo (JP); Yuichiro Kato, Tokyo (JP); Arata Iwashita, Tokyo (JP); Toshiaki Murakami, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 133 days.

(21) Appl. No.: 14/043,332

(22) Filed: Oct. 1, 2013

(65) Prior Publication Data

US 2014/0143772 A1    May 22, 2014

(30) Foreign Application Priority Data

Nov. 21, 2012    (JP) ................................. 2012-255560

(51) Int. Cl.
  *G06F 9/455*    (2006.01)
  *G06F 9/445*    (2006.01)

(52) U.S. Cl.
  CPC ........ *G06F 9/45533* (2013.01); *G06F 9/44505* (2013.01)

(58) Field of Classification Search
  None
  See application file for complete search history.

(56) References Cited

U.S. PATENT DOCUMENTS

| 2008/0301487 | A1  | 12/2008 | Hatta et al. |
| 2011/0154320 | A1* | 6/2011  | Verma ............................... 718/1 |
| 2011/0238820 | A1* | 9/2011  | Matsuoka ...................... 709/224 |
| 2014/0365662 | A1* | 12/2014 | Dave et al. .................... 709/226 |

FOREIGN PATENT DOCUMENTS

DE    EP2019358    * 1/2009    ............... G06F 9/50

OTHER PUBLICATIONS

Microsoft, Microsoft System Center About Virtual Machine Templates, 2012, https://technet.microsoft.com/en-us/library/bb740838.aspx.*
VMware, Inc. "VMware vCenter Server", vmware.com/products/vcenter-server/overview.html, 2013.

* cited by examiner

*Primary Examiner* — Meng An
*Assistant Examiner* — Jorge A Chu Joy-Davila
(74) *Attorney, Agent, or Firm* — Volpe and Koenig, P.C.

(57) ABSTRACT

A virtual client management system includes a storage unit 14 and a processor 20. The processor 20 notifies a virtual client deployment apparatus 30 that deploys virtual clients 100 on a virtual client apparatus 10 of an instruction to deploy the virtual clients 100, the instruction including setting information read from the storage unit 14; transmits a request for acquiring the setting information to the virtual client deployment apparatus 20; acquires a physical address of the virtual client 100 deployed by the setting information; stores the physical address in correlation with a record including the setting information in the storage unit 14; and receives a request (including the physical address of the virtual client 100) for acquiring the setting information from the virtual client 100 deployed by the virtual client deployment apparatus 20, reads the setting information, and sets the setting information for the virtual client 100.

7 Claims, 9 Drawing Sheets

BEFORE EXECUTING STEP S201

| BLADE INFORMATION | DATA STORE INFORMATION | STATIC IP ADDRESS | HOST NAME | GROUP NUMBER | |
|---|---|---|---|---|---|
| 7AG588800 | A1I200 | 10.198.xx.xx | GUJPVP19 | 001 | |
| | | | | | |
| | | | | | |

AFTER EXECUTING STEP S202

| BLADE INFORMATION | DATA STORE INFORMATION | STATIC IP ADDRESS | HOST NAME | GROUP NUMBER | MAC ADDRESS |
|---|---|---|---|---|---|
| 7AG588800 | A1I200 | 10.198.xx.xx | GUJPVP19 | 001 | 00-00-…-01 |
| | | | | | |
| | | | | | |

AFTER EXECUTING STEP S301                         304

| DATA STORE INFORMATION | HOST NAME | |
|---|---|---|
| A1I200 | GUJPVP19 | |
| | | |
| | | |

FIG. 5A

AFTER EXECUTING STEP S302                         304

| DATA STORE INFORMATION | HOST NAME | MAC ADDRESS |
|---|---|---|
| A1I200 | GUJPVP19 | 00-00-...-01 |
| | | |
| | | |

FIG. 5B

CREATING AND DEPLOYING VIRTUAL MACHINES TO A VIRTUAL MACHINE APPARATUS BASED ON TENDENCY OF USAGE, DEPLOYMENT RESULTS, AND SETTING INFORMATION OF VIRTUAL MACHINE CLIENTS

CROSS-REFERENCE TO RELATED APPLICATION

The present application claims priority pursuant to 35 U.S.C. §119 from Japanese patent application no. 2012-255560, filed on Nov. 21, 2012, the entire disclosure of which is hereby incorporated herein by reference.

BACKGROUND ART

1. Technical Field

The present invention relates to a virtual client management system and a virtual client management method, and more specifically to a technique for performing an initial setting and other required processes for a number of deployed virtual clients easily and efficiently.

2. Related Art

Techniques have been proposed in which a plurality of virtual clients are created by software, the virtual clients are deployed on a single hypervisor, and an operating system, hereinafter also "OS," is run on each of the virtual clients concurrently. Enterprises or the like installing, operating, and managing a great number of computers are beginning to introduce such systems, in which the above virtual clients are assigned to individual employees in place of ordinary personal computers conventionally supplied to the employees and are operated on a network for the purpose of reducing operational costs and simplifying management of computers.

This virtualization technique is drawing attention recently as an effective solution to various problems for enterprises, such as reduction of total cost of ownership, i.e., TCO, improvement of efficiency in operation/management, countermeasures in security and compliance, and business continuity plan, i.e., BCP in relation to personal computers. US Patent Application unexamined Publication No. US2008/0301487 and non-patent literature found at http://www.vmware.com/products/vcenter-server/overview.html propose techniques related to creation, management, and the like of a virtual client.

An information processing apparatus for performing creation and deployment of virtual clients deploys each virtual client on a hypervisor. However, this processing is performed according to instructions given manually by an administrator while the administrator refers to necessary information separately. Accordingly, the administrator sets various types of setting information for each virtual client each time, such as an static IP address, a license key of an OS, and the like required for operation of each virtual client as necessary. It has not been assumed that the above setting must be done for enormous numbers of virtual clients such as tens of thousands of virtual clients. This problem also arises in performing various kinds of processing such as updating of the OS, applying security patches, and scanning viruses in a great number of virtual clients that have started operation after their deployment.

SUMMARY

In view of the above, an object of the present invention is to provide a technique that enables performing an initial setting and other required processes for a number of deployed virtual clients easily and efficiently.

The virtual client management system of the present invention for solving the above and other problems comprises a storage unit for storing setting information assigned to each of multiple virtual clients, the setting information including at least a data store and a host name in a server apparatus; and a processor configured to perform a process of notifying a virtual client deployment apparatus that deploys virtual clients on a hypervisor of an instruction to deploy the virtual clients, the instruction including the setting information being read from the storage unit, a process of transmitting a request for acquiring the setting information for any of the virtual clients to the virtual client deployment apparatus that deployed the virtual clients on the hypervisor in response to the instruction to deploy, acquiring a physical address of the virtual client deployed by the setting information, and storing the physical address as acquired in correlation with a record including the setting information in the storage unit, and a process of receiving a request for acquiring the setting information from the virtual client deployed by the virtual client deployment apparatus, the request including the physical address of the virtual client, reading the setting information correlated with the physical address from the storage unit, and setting the setting information for the virtual client.

The present invention also provides a virtual client management method implemented by an information processing apparatus including a storage unit for storing setting information assigned to each of virtual clients, the setting information including at least a data store and a host name in a server apparatus, the method comprising a process of notifying a virtual client deployment apparatus that deploys virtual clients on a hypervisor of an instruction to deploy the virtual clients, the instruction including the setting information being read from the storage unit; a process of transmitting a request for acquiring the setting information for any of the virtual clients to the virtual client deployment apparatus that deployed the virtual clients on the hypervisor in response to the instruction to deploy, acquiring a physical address of the virtual client deployed by the setting information, and storing the physical address as acquired in correlation with a record including the setting information in the storage unit; and a process of receiving a request for acquiring the setting information from the virtual client deployed by the virtual client deployment apparatus, the request including the physical address of the virtual client, reading the setting information correlated with the physical address from the storage unit, and setting the setting information for the virtual client.

The virtual client management system and method of the present invention enable initialization and other required processes for a number of deployed virtual clients easily and efficiently.

BRIEF DESCRIPTION OF THE DRAWINGS

FIG. 4A shows information example 1 held by a virtual client management apparatus of the present embodiment;

FIG. 4B shows information example 2 held by the virtual client management apparatus of the present embodiment;

FIG. 5A shows information example 1 held by a virtual client deployment apparatus of the present embodiment;

FIG. 5B shows information example 2 held by a virtual client deployment apparatus of the present embodiment;

DETAILED DESCRIPTION

System Configuration

Embodiments of the present invention will be hereinafter described in detail with reference to the attached drawings.

Figure 1:
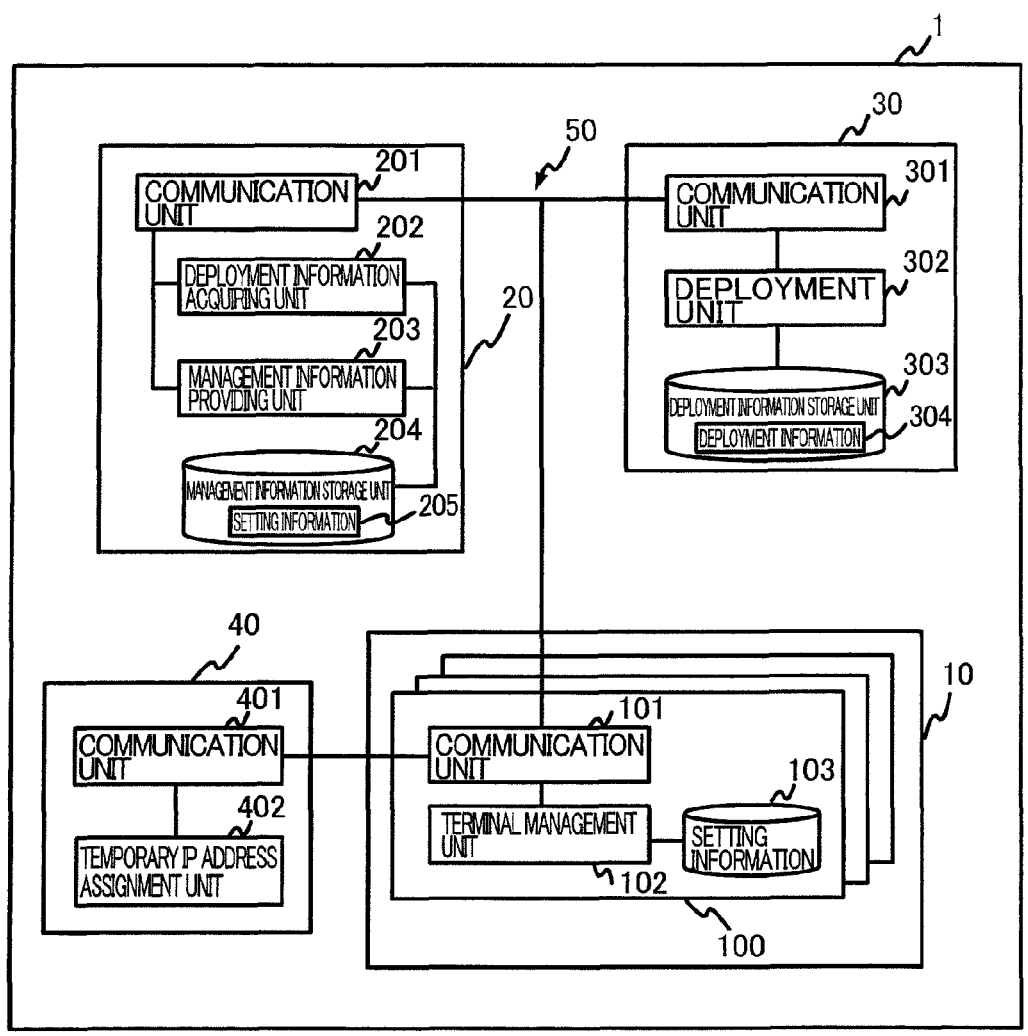
FIG. 1 is a network configuration diagram including a virtual client management system of an embodiment of the present invention.

FIG. 1 is a network configuration diagram including a virtual client management system 1 of the embodiment of the present invention. The virtual client management system 1 in FIG. 1 is a computer system that performs such processing as an initial setting and a subsequent updating required for a number of deployed virtual clients easily and efficiently. At a minimum, the virtual client management system 1 of the present embodiment may be configured to only include a virtual client management apparatus 20 as illustrated in FIG. 1. However, the virtual client management system 1 may also be configured to include at least one of a virtual client deployment apparatus 30, a virtual client apparatus 10, and a temporary IP address assignment apparatus 40. It is to be noted that the above apparatuses are communicably connected to a network 50.

The virtual client deployment apparatus 30 is an information processing apparatus that deploys several tens of virtual clients 100 on each virtual client apparatus 10 hypervisor. An existing technique may be employed for the deployment itself of the virtual clients 100 by the virtual client deployment apparatus 30. The temporary IP address assignment apparatus 40 is an information processing apparatus that assigns, to the virtual client 100, an IP address required for the virtual client 100 deployed on the virtual client apparatus 10 to initially communicate with the virtual client management apparatus 20. The temporary IP address assignment apparatus 40 is assumed to be a DHCP (Dynamic Host Configuration Protocol) server.

Then, the functions of the virtual client management system 1 of the present embodiment will be described. The functions to be described below may be implemented by executing programs provided in the virtual client management apparatus 20 constituting the virtual client management system 1, for example. It is to be noted that the virtual client management apparatus 20 stores setting information 205 including at least a data store and a host name in a blade, i.e., a server apparatus assigned to each of the virtual clients beforehand in a management information storage unit 204 provided in an auxiliary storage device 14 as a storage unit. Preferably, the setting information 205 further includes a license key of the operating system and a static IP address assigned to the virtual client.

In this case, the virtual client management apparatus 20 has a function of notifying the virtual client deployment apparatus 30 as mentioned above of an instruction to deploy the virtual client via a communication unit 201. The deployment instruction includes the setting information 205 read from a management information management unit 204 in the auxiliary storage device 14. The function is implemented in a deployment information acquiring unit 202 in FIG. 1. It is to be noted that the data store and the host name are assumed to be the setting information 205 in the deployment instruction.

The virtual client management apparatus 20 has the function of transmitting a request for acquiring a deployment result including any item of the setting information 205 to the virtual client deployment apparatus 30 having deployed the virtual client 100 on the virtual client apparatus 10 in response to the deployment instruction via the communication unit 201, acquiring a physical address of the virtual client 100 deployed with the corresponding setting information 205, and correlating and storing the physical address as acquired with a record including the corresponding setting information 205 in the management information management unit 204 in the auxiliary storage device 14. The function is implemented in the deployment information acquiring unit 202 in FIG. 1.

The virtual client management apparatus 20 has a function of receiving a request for acquiring the setting information 205 including the physical address of the virtual client 100 from the virtual client 100 deployed by the virtual client deployment apparatus 30 via the communication unit 201, reading the setting information 205 correlated with the physical address from the management information management unit 204 in the auxiliary storage device 14, and setting the setting information 205 at the virtual client 100. The capability is installed in the management information providing unit 203 shown in FIG. 1.

It is to be noted that, alternatively, the virtual client management apparatus 20 may be configured to, in the process of setting the above-mentioned setting information 205 at the virtual client 100, read the host name, the static IP address, and the license key of the operating system from the management information management unit 204 in the auxiliary storage device 14 as the setting information 205 correlated with the physical address in response to a request for acquiring setting information from the virtual client, and setting the corresponding setting information 205 at the virtual client 100.

By contrast, the virtual client deployment apparatus 30 has a function of receiving an instruction to deploy from the virtual client management apparatus 20 via a communication unit 301, and deploying the virtual client 100 on the virtual client apparatus 10 in response to the instruction to deploy. In the above deployment, the virtual client deployment apparatus 30 notifies the virtual client apparatus 10 of an instruction for creating and arranging the virtual client 100 based on the data store and the host name included in the instruction to deploy. In response to the notification, the virtual client 100 is created in the virtual client apparatus 10 and the virtual client is correlated with the corresponding data store and deployed under the corresponding host name.

The virtual client deployment apparatus 30 stores deployment information 304 including the data store correlated with each of the virtual clients 100 deployed on the virtual client apparatus 10 through the deployment and the host name in the OS and the physical address or MAC address of the virtual client 100 in the deployment information storage unit 303. In the above information, the physical address is the one acquired from the virtual client apparatus 10 on which the virtual clients 100 are deployed. The above functions are implemented in the deployment unit 302 in FIG. 1.

The virtual client deployment apparatus 30 has a function of receiving a request for acquiring a deployment result from the virtual client management apparatus 20 via the communication unit 301, acquiring the physical address of the virtual client 100 deployed based on any of the setting information 205 indicated by the acquisition request from the deployment information 304 in the deployment information storage unit 303, and returning the corresponding physical address to the virtual client management apparatus 20. The function is implemented in the deployment unit 302 in FIG. 1.

On the other hand, the virtual client 100 deployed by the virtual client deployment apparatus 30 has a function of transmitting a request for acquiring the setting information 205 including the physical address set for itself to the virtual client management apparatus 20 via the communication unit 101, receiving an instruction for setting including the setting information 205 correlated with the above physical address from the virtual client management apparatus 20, and setting the setting information 205 at setting information 103 according to an instruction. The function is implemented in a terminal management unit 102 in FIG. 1.

It is to be noted that the virtual client 100 has a function of causing the temporary IP assignment apparatus 40 as a DHCP server to assign a temporary IP address required for accessing the network 50 for communication when transmitting a request for acquiring the above-mentioned setting information 205 to the virtual client management apparatus 20. The function is implemented in the terminal management unit 102 in FIG. 1. In this case, the virtual client 100 sends a request for assignment of a temporary IP address to the temporary IP address assignment apparatus 40. In response, the temporary IP address assignment apparatus 40 finds a currently unused IP address and assigns the IP address as found as the temporary IP address to the virtual client 100. Needless to say, the temporary IP address assignment apparatus 40 and the virtual client 100 are communicably connected beforehand.

An example of a hardware configuration of respective apparatuses constituting the virtual client management system 1 of the present embodiment will be described. The apparatuses referred to herein include the virtual client apparatus 10, the virtual client management apparatus 20, the virtual client deployment apparatus 30, and the temporary IP address assignment apparatus 40.

Figure 2:
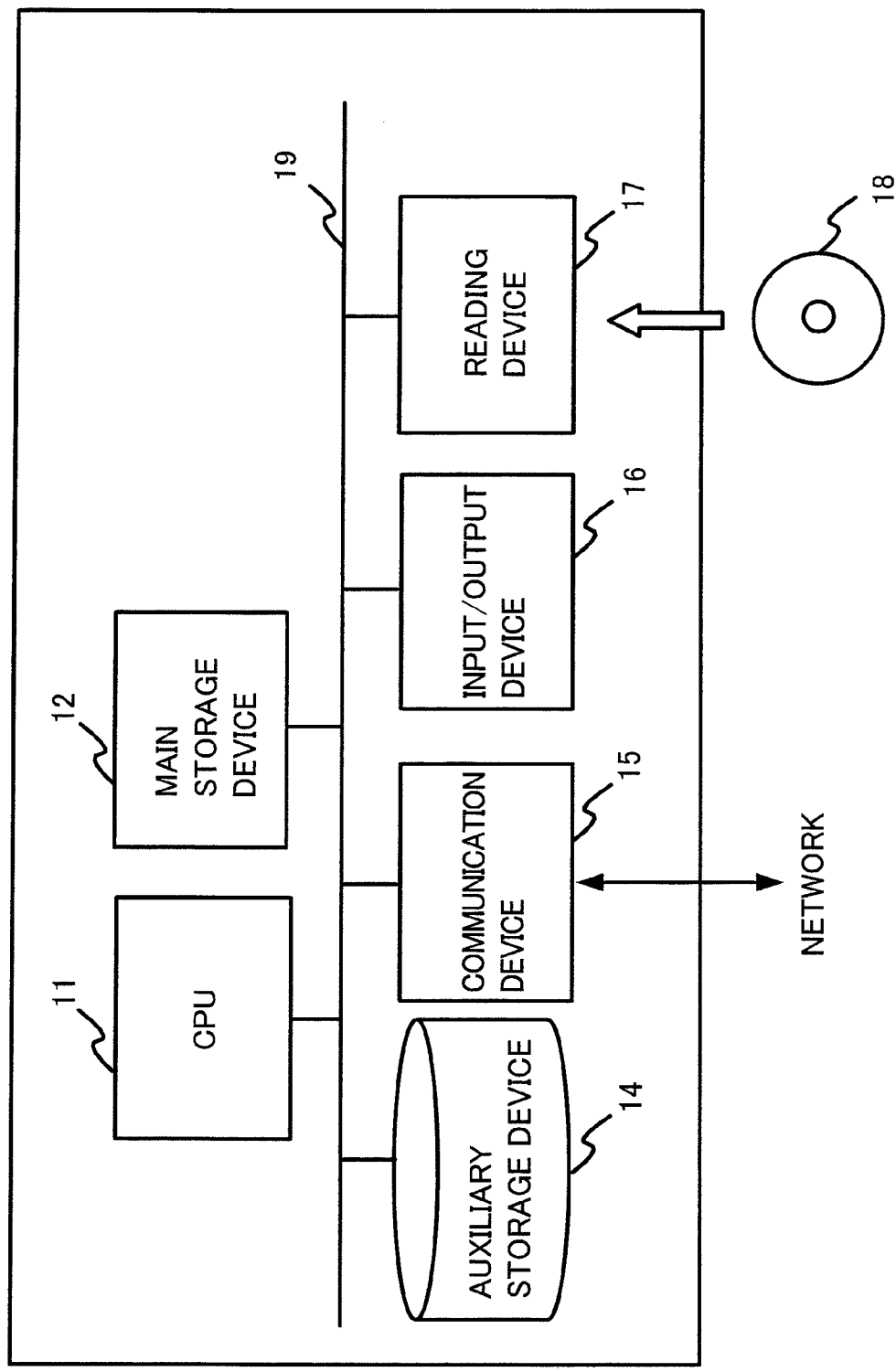
FIG. 2 is a hardware configuration diagram of each apparatus in the virtual client management system of the present embodiment.

FIG. 2 is a hardware configuration diagram of each apparatus in the virtual client management system 1 of the present embodiment. Each apparatus includes an auxiliary storage device 14 configured with an appropriate non-volatile storage device such as a hard disk drive, a main storage device 12 configured with a volatile storage device such as a RAM, a CPU 11 that reads from the auxiliary storage device 14 an operating system and programs held in the auxiliary storage device and runs the operating system and the programs as required to perform comprehensive control of the apparatus with the CPU 11 with various determination, calculation, and control processes, an input/output device 16 processing inputs and displaying processed data, a communication device 15 coupled with a network 50 to perform communication processing with the other apparatuses, and a reading device 17 reading a storage medium 18 while the above devices are coupled with an internal signal line 19.

Example of Processing Procedure

An actual procedure of the virtual client management method of the present embodiment will be described hereinbelow based on the figures. Various actions corresponding to the virtual client management method to be described below are implemented by programs and the like read from the main storage device 12 and executed by each apparatus constituting the virtual client management system 1. The programs are configured with code for performing various actions as will be described later.

Figure 3:
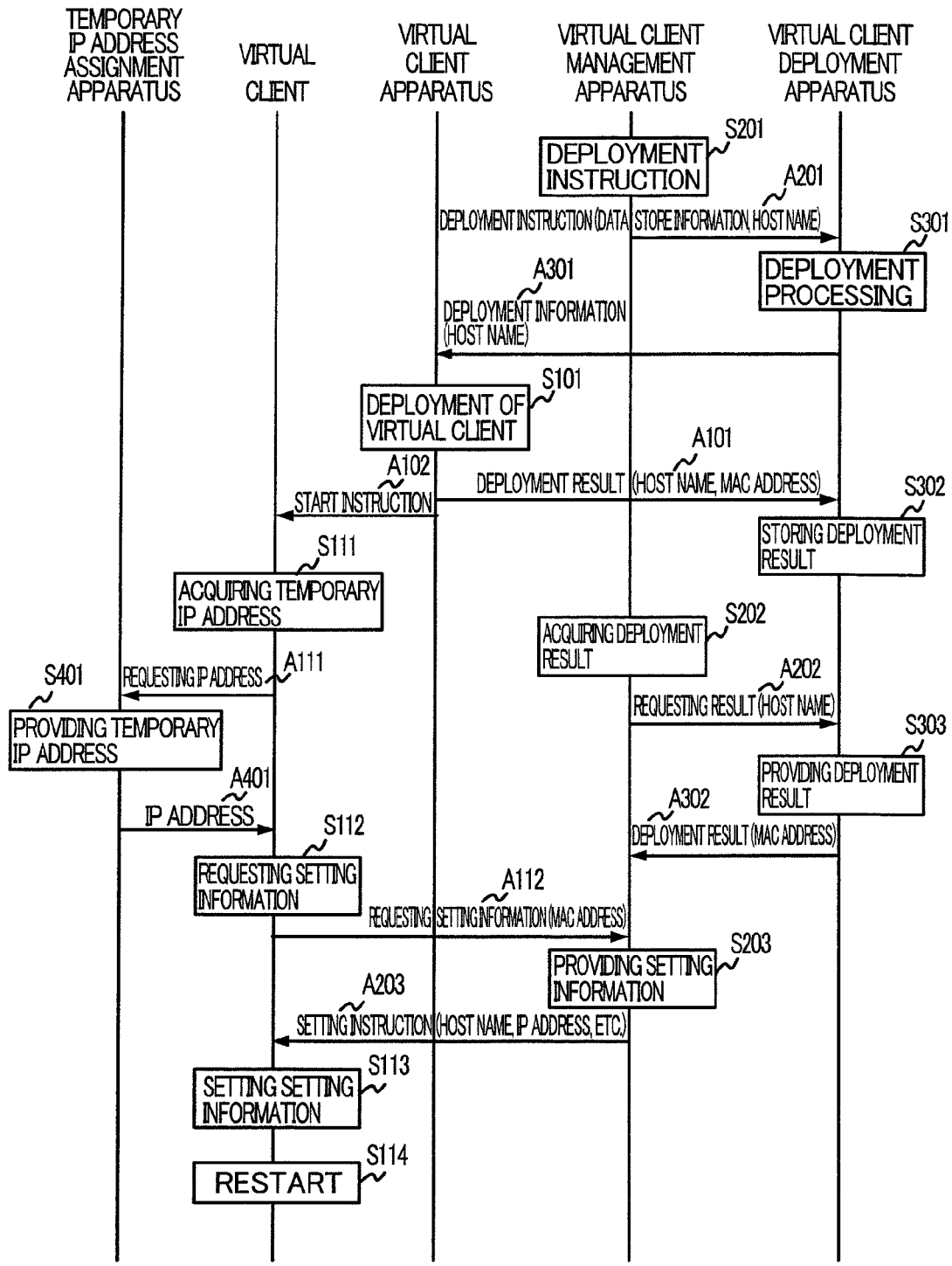
FIG. 3 is a flow chart illustrating an example of a processing procedure in a virtual client management method of the present embodiment.

FIG. 3 is a flow chart illustrating an exemplary processing procedure of the virtual client management method of the present embodiment. In response to an input instruction from a user accepted by the input/output device 16 or upon detection of a predetermined timing of execution, the virtual client management apparatus 20 reads setting information of a data store and a host name from the management information management unit 204 in the auxiliary storage device 14, and notifies the virtual client deployment apparatus 30 of an instruction to deploy A201 of a virtual client including the above setting information 205 via the communication unit 201 (S201).

It is to be noted that the setting information 205 in the management information storage unit 204 upon executing the above step S201 is configured to include a blade, a data store, a static IP address, and a host name assigned to the virtual client 100 as shown in FIG. 4A. A "group number" in FIG. 4A will be described later.

The virtual client deployment apparatus 30 receives the instruction to deploy A201 from the virtual client management apparatus 20 via the communication unit 301, and deploys the virtual client 100 on the virtual client apparatus 10 based on the data store and the host name in the deployment instruction A201 under the above host name while the virtual client 100 is correlated with the data store (S301). In this deployment, the virtual client deployment apparatus 30 notifies the virtual client apparatus 10 of deployment information A301 including the data store and the host name in the deployment instruction A201 to instruct the virtual client apparatus 10 to create and deploy the virtual client 100.

In response to the instruction, the virtual client apparatus 10 creates the virtual client 100 and deploys the virtual client 100 under the above host name while correlating the virtual client 100 with the above data store (S101). The virtual client apparatus 10 sends a deployment result A101 back to the virtual client deployment apparatus 30. The deployment result A101 includes the host name and the physical address of the deployed virtual client 100.

For each of the virtual clients 100 deployed on the virtual client apparatus 10 through the above deployment process, the virtual client deployment apparatus 30 stores deployment information 304 including the data store as correlated, a host name of an OS in the virtual client 100, and a physical address acquired from the virtual client 100 in the deployment information storage unit 303 as an deployment result (S302). The deployment information 304 of the deployment information storage unit 303 before and after step S302 differs in that it has or does not have a physical address, as shown in FIG. 5B (after S302).

Then, the virtual client management apparatus 20 transmits a request for acquiring the deployment result A202 including either item of the setting information 205 such as a host name to the virtual client deployment apparatus 30 regarding the deployment of the virtual client 100 performed in response to the above deployment instruction via the communication unit 201 (S202).

The virtual client deployment apparatus 30 receives the above acquisition request A202, reads the physical address of the virtual client 100 correlated with the above host name held in the deployment information storage unit 303, and sends the physical address back to the virtual client management apparatus 20 (S303).

The virtual client management apparatus 20 acquires the physical address sent from the virtual client deployment apparatus 30 as the deployment result A302, correlates the physical address with the record including the corresponding host name in the management information management unit 204 in the auxiliary storage device 14, and stores the physical address in the management information management unit 204. The setting information 205 in a state in which the physical address is stored in the management information management unit 204 is shown in FIG. 4B.

On the other hand, the virtual client 100 as deployed at the above step S101 starts operation according to a start instruction A102 from the virtual client apparatus 10, and acquires a temporary IP address required for accessing the network 50 and performing communication (S111). In this case, the virtual client 100 sends a request for assigning the temporary IP address A111 to the temporary IP address assignment apparatus 40. In response, the temporary IP address assignment apparatus 40 as a DHCP server finds a currently unused IP address A401 with the temporary IP address assignment unit 401 and provides the virtual client 100 with the IP address A401 as specified (S401). Of course, the temporary IP address assignment apparatus 40 and the virtual client 100 are communicably coupled with each other beforehand.

The virtual client 100 to which the temporary IP address has been assigned and allowed to access the network 50 transmits a request for acquiring the setting information 205, including the physical address of the virtual client 100, to the virtual client management apparatus 20 via the communication unit 101 (S112).

The virtual client management apparatus 20 receives the above acquisition request from the virtual client 100 via the communication unit 201, reads the setting information 205 correlated with the physical address from the management information management unit 204, and sets an instruction for setting A203 including the above setting information 205 at the virtual client 100 (S203). Here, the virtual client 100 receives the setting instruction A203 including the setting information 205 from the virtual client management apparatus 20, sets the setting information 205 at the setting information 103 according to the instruction (S113), and restarts itself (S114).

It is to be noted that, in the processing of setting the setting information 205 in the virtual client 100 according to the above setting instruction A203, it is also possible that the virtual client management apparatus 20 reads the host name, the static IP address, and a license key of the operating system as the setting information 205 correlated with the corresponding physical address from the management information management unit 204 in the auxiliary storage device 14 in response to the request for acquiring the setting information A112 from the virtual client 100, and sets the above setting information 205 in the virtual client 100.

Correspondence Between Virtual Client and Data Store

Figure 6:
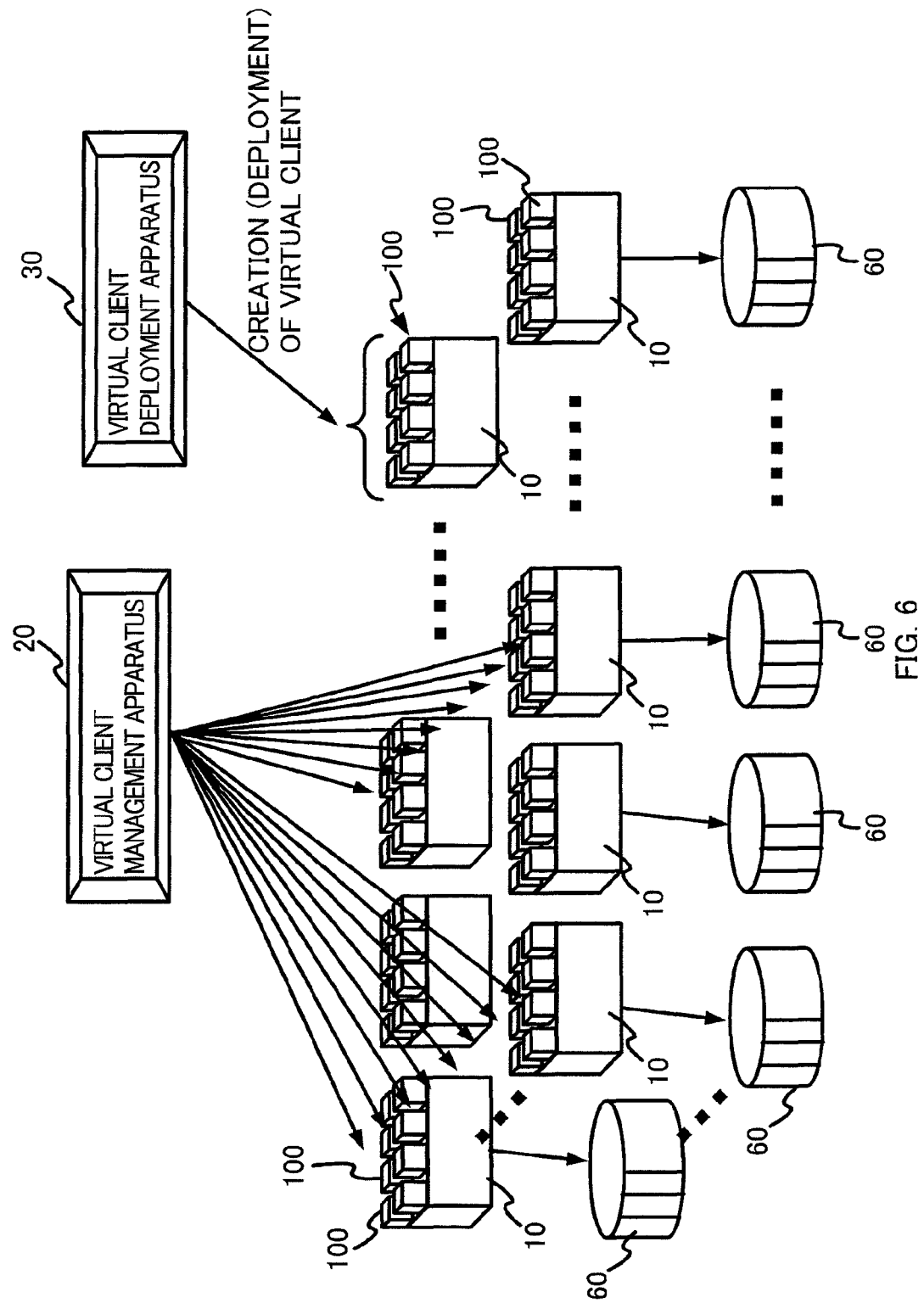
FIG. 6 shows example 1 of a concept of the virtual client management system of the present embodiment.

FIG. 6 shows an example 1 of a concept of the virtual client management system of the present embodiment. Through the deployment as described above, the virtual clients 100 are deployed on the virtual client apparatus 10. Once the setting of the static IP address and the like has been carried out and the virtual client 100 has been put in actual operation, then predetermined processing, such as updating of the operating system and applications and scanning for viruses, may be performed at each virtual client 100.

Therefore, in the present embodiment, the virtual client management apparatus 20 is configured to assign a common data store 60 to the virtual clients 100 sharing the virtual client apparatus 10 to which the virtual clients 100 have been deployed as shown in FIG. 6 and store the data store 60 assigned to the above virtual clients 100 in the management information management unit 204 as one item of the setting information 205 while the data store 60 is correlated with the above virtual clients 100. According to this configuration, when the predetermined processing for the virtual clients 100, such as updating of the operating system and applications, and scanning for viruses, are performed after the deployment of the virtual clients 100, the processing load can be distributed over the virtual client apparatuses 10 as hypervisors.

Figure 7:
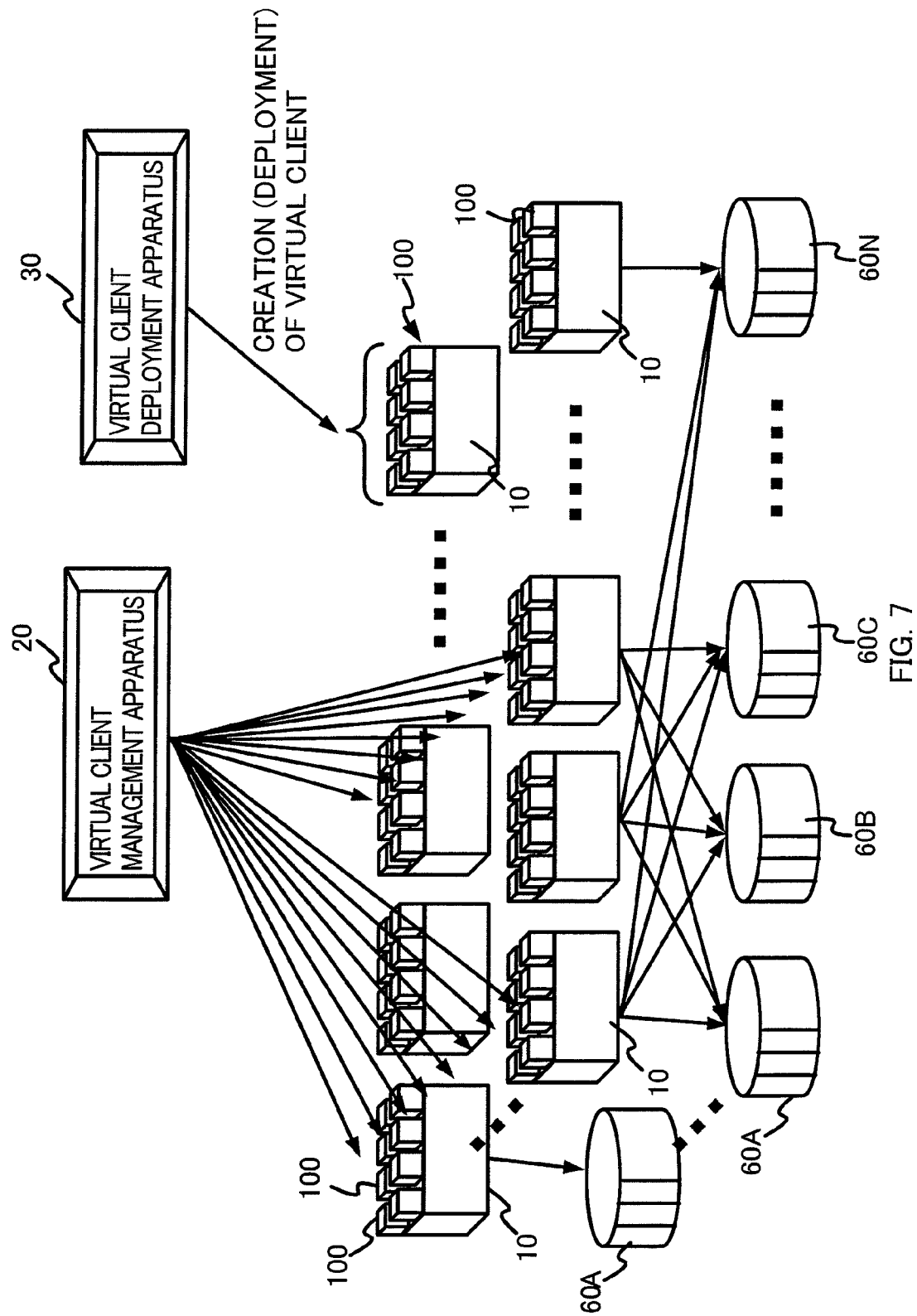
FIG. 7 shows example 2 of a concept of the virtual client management system of the present embodiment.

FIG. 7 shows an example 2 of a concept of the virtual client management system of the present embodiment. In addition to the configuration shown in FIG. 6, in order to distribute the network load between the virtual client apparatus 10 and the data store 60, the virtual client management apparatus 20 is configured to assign the virtual clients 100 sharing the virtual client apparatus 10 to which the virtual clients 100 have been deployed to a plurality of data stores 60A-60N in a distributed manner as shown in FIG. 7 and store each data store 60 to which the above virtual clients 100 are assigned in the management information management unit 204 as one item of the setting information 205 while the each data store is correlated with the corresponding virtual clients 100. According to this configuration, when the predetermined processing for the virtual clients 100, such as updating of the operating system and applications, and scanning for viruses, are performed after the deployment of the virtual clients 100, since a different one of the data stores 60A-60N is used for a predefined number of virtual clients 100 in the virtual client apparatus 10 as a hypervisor, distribution of the network load between the virtual client apparatus 10 and the data stores 60A-60N can be expected.

Figure 8:
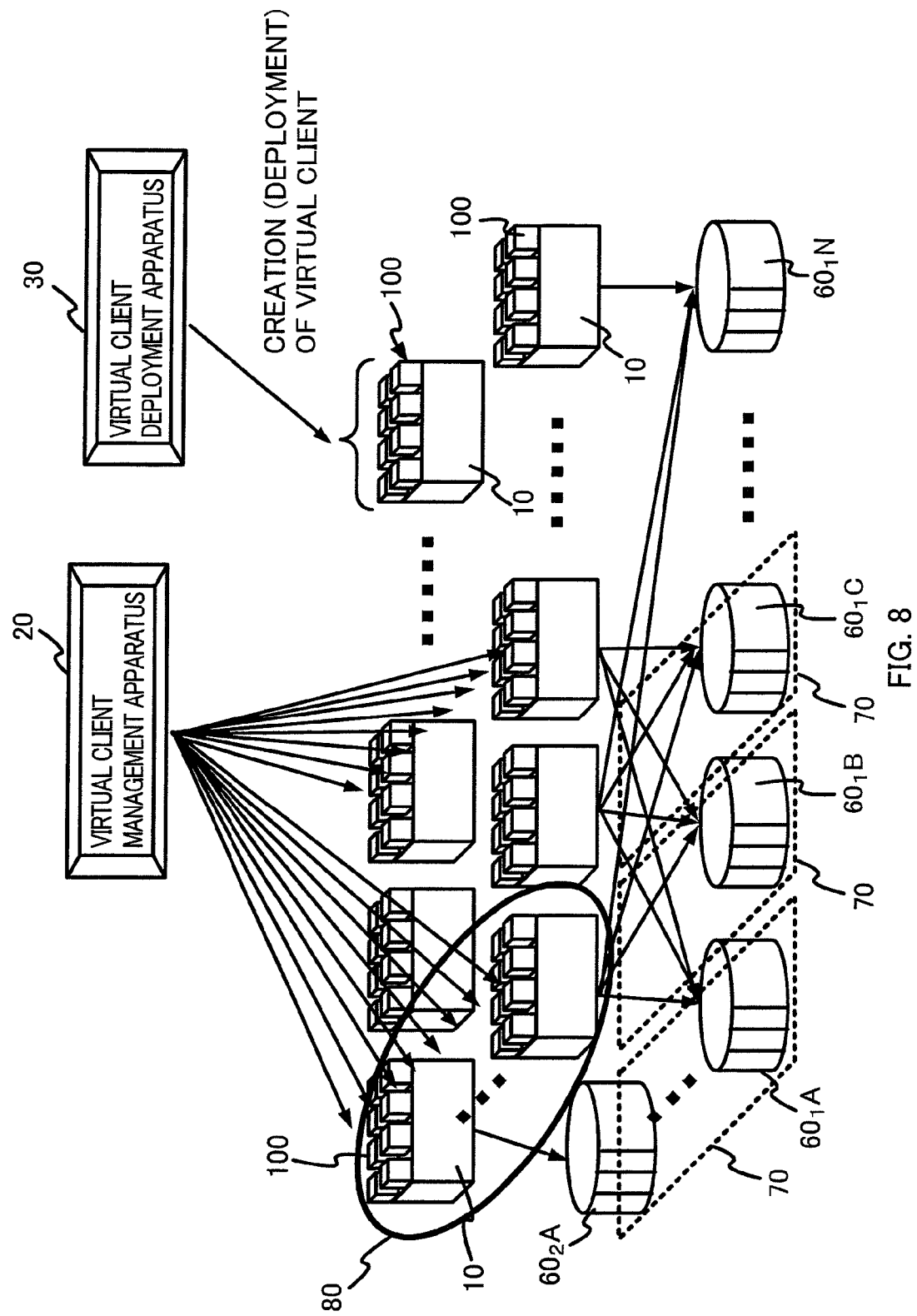
FIG. 8 shows example 3 of a concept of the virtual client management system of the present embodiment.

FIG. 8 shows an example 3 of a concept of the virtual client management system of the present embodiment. In addition to the configuration shown in FIG. 7, in order to distribute the network load between the virtual client apparatus 10 and the data store 60, the virtual client management apparatus 20 is configured to assign the virtual clients 100 on the virtual client apparatus 10 to a plurality of data stores $60_1$A-$60_1$N, $60_2$A-$60_2$N in a distributed manner for the virtual client apparatuses 10 to which the virtual clients 100 are deployed that belong to different chasses 70, respectively. Further, the virtual client management apparatus 20 is configured to group the virtual clients 100 on the virtual client apparatuses 10 sharing the chassis 70 to which the virtual client apparatuses 10 belong without sharing a data store into groups 80 as shown in FIG. 8.

The virtual client management apparatus 20 is configured to correlate the data stores to which each virtual client apparatus is assigned with the virtual clients 100, correlate the group number of the group 80 into which the virtual clients 100 have been grouped with the virtual clients 100, and store the above correlated data in the management information management unit 204 as the setting information 205. The group number is assumed to be a number created by incrementing by one in the order of grouping.

In this case, when performing predetermined processing for the respective virtual clients 100, the virtual client management apparatus 20 broadcasts an instruction for performing the processing designating one or more group numbers to the respective virtual clients 100 based on the above correlations, such as the data store and the group number in the setting information 205, in the management information management unit 204. It is to be noted that such predetermined processing may be executed not only by broadcasting the instruction for processing execution but the virtual client 100 may automatically start operation at a timing predetermined for each group number using a task scheduler or the like in its operating system and execute the predetermined processing.

According to the above configuration, when performing predetermined processing for the virtual client 100, such as updating of the operating system and applications, and scanning for viruses, after the deployment of the virtual clients 100, a constant number of the virtual clients 100 in the virtual client apparatus 10 as a hypervisor for each group 80 as formulated use the data store that is not shared with the virtual clients in a different group. Therefore, further distribution of the network load between the virtual client apparatus 10 and the data stores $60_1A$-$60_1N$, $60_2A$-$60_2N$ can be expected.

It is to be noted that the virtual client management apparatus 20 may be configured to hold the tendency in usage of the virtual clients 100 for each unit to which users to whom the virtual clients 100 are assigned belong in the auxiliary storage device 14 beforehand. The tendency may include time slots when the virtual clients 100 are to be used more frequently or less frequently, and the like. The frequency may be determined according to whether it is higher or lower than a constant threshold or according to relative relationship during a constant time period such as a single day. In this case, for the purpose of avoiding deployment of the virtual clients 100 of a similar usage tendency to the same virtual client apparatus 10, the virtual client management apparatus 20 may select certain users from among all users, i.e., the host name, to be included in the deployment instruction A201 to the respective virtual client apparatuses 10, so that the number of users of an identical or similar usage tendency exceeds a constant threshold, and create the deployment instruction A201.

Although a best mode for carrying out the present invention is described specifically hereinabove, the present invention should not be considered limitative thereto, but may be modified in many ways within the scope thereof.

According to the above embodiment of the present invention, it is enabled to perform an initial setting and other required processes for a number of deployed virtual clients easily and efficiently.

According to the description in the present specification, at least the following will be disclosed. Namely, in the virtual client management system, the processor may be configured to notify the virtual client deployment apparatus of an instruction including the data store and the host name in the setting information as an instruction to deploy. According to the above, the virtual client deployment apparatus that deploys the virtual clients is able to perform fast deployment processing according to the data store and the host name as specified and, resultantly, to improve efficiency of virtual client management.

It is to be noted that, in the above virtual client management system, the storage unit may further store a license key of an operating system assigned to the virtual client and a static IP address as the setting information. In this case, the processor is configured to perform a process of reading from the storage unit the host name, the static IP address, and the license key of the operating system as the setting information correlated with the physical address in response to the request for acquiring the setting information from the virtual client, and setting the setting information for the virtual client. Accordingly, a host name, a static IP address to be used in subsequent communication, and a license key required in starting the operating system can be set efficiently in the virtual clients deployed on the hypervisor.

Further, in the above virtual client management system, the processor may be configured to further perform a process of assigning each of the virtual clients sharing a common hypervisor on which the virtual clients are deployed to a common data store, and storing a correlation between the data store assigned and the virtual clients as the setting information in the storage unit. According to this configuration, when the predetermined processing for the virtual clients, such as updating of the operating system and applications, and scanning for viruses, are performed after the deployment of the virtual clients, distribution of the processing load over each hypervisor can be expected.

Further, in the above virtual client management system, the processor may be configured to further perform a process of assigning each of the virtual clients sharing a common hypervisor on which the virtual clients are deployed to a plurality of data stores in a distributed manner, and storing a correlation between the data store assigned and the virtual clients as the setting information in the storage unit. According to this configuration, when the predetermined processing for the virtual clients such as updating of the operating system and applications, and scanning for viruses are performed after the deployment of the virtual clients, since a different one of the data stores is used for a predefined number of virtual clients in each hypervisor, distribution of the network load between the hypervisor and the data stores can be expected.

Furthermore, in the above virtual client management system, the processor may be configured to further perform a process of assigning the virtual clients sharing a common hypervisor on which the virtual clients are deployed to a plurality of data stores in a distributed manner, grouping together the virtual clients on the hypervisor that do not share the same data store, and storing a correlation between each of the data stores assigned and the virtual clients and correlation between the virtual client and a group number of the group into which the virtual client is grouped as the setting information in the storage unit, and a process of concurrently delivering to each of the virtual clients an instruction for performing a process designating one or more group numbers based on the correlations for the setting information in the storage unit upon performing a predetermined process for each of the virtual clients. According to this configuration, when performing predetermined processing for the virtual client, such as updating of the operating system and applications, and scanning for viruses, after the deployment of the virtual clients, a constant number of the virtual clients in each hypervisor for each group as formulated use the data store that is not shared with the virtual clients in a different group. Therefore, further distribution of the network load between the hypervisor and the data stores can be expected.

What is claimed is:

1. A virtual client management system comprising:
   a storage unit configured to store setting information, deployment results and tendency in usage information for each of a plurality of virtual machine clients, wherein the setting information includes at least a location of one or more data stores and a host name in a server apparatus, wherein the data stores comprise one or more storage areas that store data for the virtual machine clients;
   one or more virtual machine apparatus having a physical address that are communicatively coupled to a virtual client management apparatus;
   the virtual client management apparatus communicatively coupled to the storage unit and configured to:
   read the setting information and the tendency in usage from the storage unit for the virtual machine client;
   determine one of the virtual machine apparatus to assign the virtual machine client based on the tendency in usage read from the storage unit,
   transmit an instruction to deploy one of the virtual machine clients to a virtual client deployment apparatus, wherein the instruction to deploy includes the setting information read from the storage unit and the determined virtual machine apparatus;
   transmit a request to acquire the setting information for any of the virtual machine clients to the virtual client deployment apparatus that deployed the virtual machine clients on a hypervisor in response to the instruction to deploy; and the virtual client deployment apparatus communicatively coupled to the storage unit and the virtual client management apparatus and configured to:

receive the instruction to deploy the virtual machine client, transmit deployment information to a virtual client apparatus, receive from the virtual client apparatus the deployment result that includes the physical address of the virtual client apparatus, and store the deployment results in the storage unit.

2. The virtual client management system claimed in claim 1, wherein the setting information includes a license key of an operating system assigned to the virtual client and a static IP address.

3. The virtual client management system claimed in claim 2, wherein the virtual client management apparatus is configured to:

assign each of the virtual machine clients sharing a common hypervisor on which the virtual machine clients are deployed to a common data store, and store a correlation between the data store assigned and the virtual machine clients as the setting information in the storage unit.

4. The virtual client management system claimed in claim 2, wherein the virtual client management apparatus is further configured to:

assign the virtual machine clients sharing a common hypervisor on which the virtual machine clients are deployed to a plurality of data stores in a distributed manner, and store a correlation between each of the data stores assigned and the virtual machine clients as the setting information in the storage unit.

5. The virtual client management system claimed in claim 2, wherein the virtual client management apparatus is further configured to:

assign the virtual machine clients to one of the virtual machine apparatus based on a correlation between each of the data stores assigned and the virtual machine clients and a correlation between the virtual client and a group number of the group into which the virtual client is grouped;

store the correlation between each of the data stores assigned and the virtual machine clients and the correlation between the virtual client and the group number of the group into which the virtual client is grouped as the setting information in the storage unit; and concurrently deliver to each of the virtual machine clients an instruction for performing a process designating one or more group numbers based on the correlations for the setting information in the storage unit upon performing a predetermined process for each of the virtual machine clients.

6. A virtual client management method implemented by an information processing apparatus including:

a storage unit for storing setting information, deployment results, and tendency in usage information assigned to each of a plurality of virtual machine clients, the setting information including at least a data store and a host name in a server apparatus, the method comprising:

determining a determined virtual machine apparatus from one or more virtual machine apparatus to assign the virtual machine client based on a tendency in usage read from the storage unit;

notifying a virtual client deployment apparatus that deploys virtual machine clients on a hypervisor of an instruction to deploy the virtual machine clients, the instruction including the setting information read from the storage unit and the determined virtual machine apparatus;

transmitting a request for acquiring the setting information for any of the virtual machine clients to the virtual client deployment apparatus that deployed the virtual machine clients on the hypervisor in response to the instruction to deploy, acquiring a physical address of the virtual client deployed by the setting information, and storing the physical address acquired in correlation with a record in correlation with a record including the setting information in the storage unit; and receiving a request for acquiring the setting information from the virtual client deployed by the virtual client deployment apparatus, the request including the physical address of the virtual client, reading the setting information correlated with the physical address from the storage unit, and setting the setting information for the virtual client.

7. The virtual client management system claimed in claim 1, wherein the assigned virtual machine apparatus is determined so that virtual machine clients with similar tendency in usage are assigned to different virtual machine apparatus.

* * * * *